United States Patent [19]

Seddon

[11] Patent Number: 4,695,670
[45] Date of Patent: Sep. 22, 1987

[54] PRODUCTION OF GASOLINE

[75] Inventor: Duncan Seddon, Mount Eliza, Australia

[73] Assignees: The Broken Hill Proprietary Co., Ltd., Melbourne; Commonwealth Scientific and Industrial Research Organisation, Campbell ACT, both of Australia

[21] Appl. No.: 847,242

[22] Filed: Apr. 2, 1986

Related U.S. Application Data

[63] Continuation of Ser. No. 715,381, Mar. 25, 1985, abandoned.

[30] Foreign Application Priority Data

Mar. 27, 1984 [AU] Australia .............................. PG4265

[51] Int. Cl.⁴ .............................................. C07C 2/02
[52] U.S. Cl. .................................................. 585/533
[58] Field of Search ......................................... 585/533

[56] References Cited

U.S. PATENT DOCUMENTS 3,960,978  6/1976  Givens et al. ...................... 585/533
4,150,062  4/1979  Garwood et al. ................... 208/71
4,418,235  11/1983 Haag et al. .......................... 585/533

Primary Examiner—Curtis R. Davis
Attorney, Agent, or Firm—Murray and Whisenhunt

[57] ABSTRACT

Process for conversion of a light olefinic feedstock into gasoline by contact with a zeolite catalyst, characterized in that the catalyst contains at least 0.5% of weight by a Group IA metal oxide, has an X-ray powder diffraction pattern (Co radiation) exhibiting the presence of ZSM-5 zeolite and characterized by a peak in the region $2\theta = 27.0 \pm 0.2$ which is greater in intensity than peaks at both $2\theta = 9.29 \pm 0.2$ and $2\theta = 10.25 \pm 0.2$ degrees.

8 Claims, No Drawings

PRODUCTION OF GASOLINE

This is a continuation application of Ser. No. 715,381, filed Mar. 25, 1985, now abandoned.

This invention relates to the production of high octane, gasoline from light olefins.

It is important that processes for the production of gasoline be energy efficient. In order to meet the growing demands for high octane gasoline, refiners have in the past utilized lead compounds to improve the quality of gasoline blending stocks but, at present, lead pollution is seen as a serious problem. There is a need therefore to find routes to high octane gasoline which are efficient in terms of consumption of scarce natural resources and which do not require the presence of lead.

Additives such as alcohols or ethers, for example methyl-tertiary-butyl ether (MTBE), can be used as octane enhancers and so offset the use of lead compounds. These materials are expensive and require the provision of new plant to produce them for gasoline blending.

In many countries, for example Australia, the use of scarce petroleum feed stocks can be offset by the utilization of other fossil fuels which are available in much greater quantities e.g. natural-gas and coal. Although many routes are available by which these fossil fuels can be converted into low-grade petroleum substitutes, there is increasing interest in their conversion into light olefins.

This can be accomplished by first converting the fossil fuel, coal or natural gas, into synthesis-gas (a mixture of carbon monoxide and hydrogen), and then applying Fischer-Tropsch technology to convert the synthesis-gas into olefins. An example of a two step route is described by Murchison and Murdick in "Hydrocarbon Processing", January, 1981 p. 159. An attractive, single step route has been described in "Hydrocarbon Processing", November, 1980, p. 139.

Olefins can also be obtained from other sources such as a refinery's FCC unit, or from methanol or other alcohols, as described for example in U.S. Pat. No. 4,025,576. Olefins from any source such as these can be converted into high octane lead free gasoline.

Andrews and Bonnifay, in Hydrocarbon Processing April, 1977, p. 161, have compared the IFP Dimersol Process with alkylation routes for producing high octane lead-free petrol from olefins. The latter route gives a product of inferior gasoline quality (RON), whereas the former process (IFP Dimersol) employs expensive catalysts and demands a pure and dry feedstock for operation.

Recently the use of zeolite catalysts has been described for upgrading light olefins to gasoline or gasoline components such as aromatic compounds. Thus U.S. Pat. No. 3,760,024 describes the use of H-ZSM-5 to convert propylene to aromatics. U.S. Pat. No. 3,960,978 describes special treatment of zeolites (e.g. steaming, coking, exchange with divalent metal cations such as zinc) to produce an olefinic gasoline. U.S. Pat. No. 4,150,062 describes an improvement in using large quantities of co-fed water; again the typical catalyst used was extensively modified by first transforming to the acid form then treating with silver then potassium containing solutions. European Pat. No. 31675 discloses the use of special high silica-zeolites for the synthesis of high-octane gasoline from olefins.

What we have discovered is that olefins can be converted into good quality gasoline utilizing certain zeolite catalysts. The catalysts used in the process of this invention do not require extensive modification or extensive ion-exchange into the acid or hydrogen form. The process using these catalysts does not require the presence of co-fed water or other diluents.

It will be evident from the foregoing that an important parameter in the quality of gasoline produced is a high RON. This can be achieved by a high aromatic content or high olefinic content. Aromatic gasoline suffers from the disadvantage of high liquid density. An advantage of olefinic gasoline is that it can be converted into higher boiling materials such as jet-fuel and distillate, as described for example in our Australian patent application No. 24554/84. It is a particular advantage of this invention that an olefin rich gasoline is produced. Preferably the gasoline product of the present invention has a RON (clear) between 90 and 98 and more preferably between 92 and 97.

Zeolites are a class of open-pored crystalline aluminosilicates which can be recognised by their characteristic powder X-ray diffraction spectrum. The class of zeolites pertinent to this invention are synthetic zeolites which may or may not have a mineral analog. A characteristic of the synthesis is the presence of organic compounds which remain entrapped within the zeolite lattice when the synthesis gel is crystallised. Examples of such organic compounds are quaternary ammonium salts such as, tetraethylammonium, tetrapropylammonium and tetrabutylammonium, which may be present as sulphates, chlorides, bromides or iodides and the like; amines such as trimethylamine, triethylamine, tripropylamine and tributylamine; alcohols such as methanol, ethanol and propanol; diamines such as 1,6-hexanediamine, 1,4-butanediamine and 1,8-octanediamine; and diols such as 1,6-hexanediol. This list is by no means exhaustive. The varieties of organic compounds suitable for inclusion within zeolites during synthesis are well known by those skilled in the art.

It is a necessary requirement that upon heating to a high temperature (e.g. 500° C.) in oxygen or air, the organic-compound burns and in so doing the product generates active sites. The zeolite must of course be sufficiently robust to withstand this treatment.

Another distinguishing characteristic of the zeolites suitable for the process to be described is that the pore size of the channels and cages within the zeolite are of a size suitable to allow the egress of molecules in the gasoline boiling range. In general pore sizes which are smaller than eight-ring windows (see D. W. Breck, "Zeolite Molecular Sieves", Wiley and Sons, 1974) will not be suitable for the process of this invention. It will be recognised that large pore zeolites which contain twelve ring-windows (or larger) usually show high rates of fouling in hydrocarbon reactioins. It will be also recognised that these materials may be synthesized (or modified) by special techniques in forms such that this high fouling rate is lessened e.g. synthesis at high silica/alumina ratio.

Of particular interest to the process to be described are the synthetic pentasil zeolites containing ten-ring windows such as those of the ZSM-5 family of zeolites.

Another characteristic feature of the zeolite is that it contains basic cations of groups Ia or IIa of the Periodic Table. The zeolites of this invention have both organic cations and alkali cations present within the zeolite lattice.

Zeolites which contain only alkali cations, and zeolites which contain only organic cations, are not suitable.

The invention accordingly provides a process for conversion of a light olefinic feedstock into gasoline by contact with a zeolite catalyst, characterized in that the catalyst contains at least 0.5% by weight of a Group IA metal oxide, has an X-ray powder diffraction pattern (Co radiation) exhibiting the presence of ZSM-5 zeolite and characterized by a peak in the region $2\theta = 27.0 \pm 0.2$ which is greater in intensity than peaks at both $2\theta = 9.20 \pm 0.2$ and $2\theta = 10.25 \pm 0.2$ degrees.

For practical use, the zeolite requires fabrication into a solid particle, chip or pellet. This fabrication may or may not require the assistance of a binder or inert diluent material. The choice of binder and size of particle will be chosen by the engineering requirements of equipment in which the catalyst is to be used. In a fluid bed reactor a small particle, of say 30–100 μm, and of high attrition resistance, may be the choice, and this may necessitate supporting the zeolite within a silica matrix formed by a spray dried or sol-gel technique. For a fixed bed reactor, larger particles e.g. tablets of 5 mm or more in diameter may be the choice. These might be formed possibly with the aid of diluents such as alumina, or clays such as bentonite. In some instances the binder may not be totally inert but may provide a co-catalytic role by, for example, providing additional acid sites, or may provide a modification role by dilution of the catalyst, or provide moderating metal ions which, without being limited by theory, might, under the conditions of incorporating the zeolite and the binder, be transferred from the binder component to the zeolite component of the catalyst, or provide metal ions which, with the presence of hydrogen, fulfill a secondary role such as coke or heavy hydrocarbon reduction or will, in the presence of oxygen, facilitate catalyst regeneration.

EXAMPLE 1

Manufacture of Zeolite

A silica-alumina gel was made up from aluminium wire (75.9 g), sodium hydroxide (456 g) silica sol (LUDOX HS40 (trade mark), 20.0 kg) and water (33 L).

The gel was charged into an autoclave along with tetrapropylammonium bromide (4.4 kg), sodium chloride (7.5 kg) and a further quantity of water (approx. 5 L). The silica content of the resultant gel was approx. 11.4% (wt). The gel was crystallised by heating to 175° C. and stirring at this temperature and autogeneous pressure for twelve hours. After cooling to ambient the discharged crystalline aluminosilicate was separated from the mother liquor by filtration, and the product washed with water then oven dried (120° C.).

The product had the XRD pattern (Co radiation, $\lambda_m = 1.7021$ Ångstroms) shown in Table 1.

Chemical analysis (wt %) showed the product contained 93.2% $SiO_2$, 1.63% $Al_2O_3$, 1.06% $Na_2O$, 7.3% C, expressing all metal as its oxide.

TABLE 1

| $2\theta$ | I | $2\theta$ | I | $2\theta$ | I |
|---|---|---|---|---|---|
| 9.20 | VS | 20.66 | W | 31.05 | MW |
| 10.25 | S | 22.40 | MW | 31.40 | MW |
| 10.55 | SM | 23.67 | M | 32.00 | VW |
| 11.50 | W | 24.26 | M | 34.10 | MW |
| 13.81 | MW | 25.30 | VW | 34.95 | MW |
| 14.51 | W | 25.82 | MW | 35.37 | W |
| 15.32 | W | 26.30 | W | 36.45 | W |
| 16.18 | M | 26.91 | VVS | 38.25 | VW |
| 17.00 | MW | 27.04 | VS | 40.10 | VW |
| 17.20 | M | 27.55 | MS | 43.10 | VW |
| 18.03 | MW | 27.85 | S | 43.90 | VW |
| 18.50 | M | 28.40 | S | 44.60 | VW |
| 19.20 | VW | 29.73 | VW | 52.90 | W |
| 20.07 | W | 30.15 | MW | 53.28 | MW |

S = strong, M = medium, W = weak, V = very

EXAMPLE 2

Manufacture and Use of Catalyst

A portion of the product prepared in Example 1 was then mixed with bentonite (2:1, zeolite: bentonite, W/W) and water and then formed into extrusions (3 mm). These were hardened by drying at 120° C. then firing at 500° C. in a stream of air which was moistened by bubbling through water at room temperature. The catalyst extrusion had a $Na_2O$ content of 1.50 wt % after firing.

The catalyst (70g) was charged into a down flow tubular reactor, fitted with several thermocouples so that the bed temperature at various points could be monitored. Propylene was then passed through the catalyst bed; pertinent details of reaction conditions and product analysis are given in Table 2.

TABLE 2

| Reactant: Propylene<br>Set temperature$^{(a)}$: 300° C.<br>Pressure: Atmospheric | | | |
|---|---|---|---|
| Elapsed on-stream-time (hr) | 6 | 12 | 18 |
| $WHSV(hr^{-1})$ | 0.9 | 0.8 | 0.7 |
| Max temperature$^{(b)}$(°C.) | 394 | 386 | 385 |
| Propylene conversion$^{(f)}$(%) | 100 | 97 | 96 |
| Liquid yield$^{(c,f)}$(%) | 72 | 80 | 82 |
| Aliphatics in liquid$^{(d,f)}$(%) | 82 | 82 | 76 |
| $I(^A/O)^{(e,f)}$ | 0.31 | 0.11 | 0.12 |
| Accumulated liquid product: | $I(^A/O)^{(e)} = 0.23$<br>RON (clear) = 94.5<br>Density = 0.7166 $gcm^{-3}$ | | |

The superscripts designate as follows:
$^{(a)}$external heater setting
$^{(b)}$maximum temperature observed in reaction bed
$^{(c)}$grams of liquid product at ambient per grams of propylene converted
$^{(d)}$by g.l.c. analysis
$^{(e)}$ratio of intensity of aromatic protons to intensity of olefinic protons determined by $^1$H.n.m.r.
$^{(f)}$results from product accumulated since previous period (in 6 hrs in this case)

EXAMPLE 3

Using Prior Art Treatments

To illustrate the effect of the prior art wherein alkali-metal cations were removed from the catalyst, a portion of the material produced in Example 1, (i.e. before mixing with bentonite) was ion-exchanged with hydrochloric acid before and after the calcination step. This removed substantial quantities of the intercrystalline sodium cation as witnessed by the fall in sodium content of the final bentonite extrudate to 0.57 wt %. This product was then calcined at 500° C. in moist air as before. The catalyst was used to convert propylene.

The results are shown in Table 3, from which it is evident that more aromatics are produced (e.g. higher value of $I(^A/O)$). This results in a slightly improved RON value but there is also a marked increase in the product liquid density. Also evident is the poor stability of this catalyst i.e. the liquid product shows marked changes with on-stream-time.

TABLE 3

| Reactant: Propylene | |
|---|---|
| WHSV: 2.4 hr$^{-1}$ | Set temperature$^{(a)}$: 300° C. |
| Pressure: atmospheric | Max temperature$^{(b)}$: 483° C. |

| Elapsed time on stream (hr) | 3 | 6 | 9.5 |
|---|---|---|---|
| Propylene conversion$^{(f)}$(%) | 82 | 84 | 82 |
| Liquid yield$^{(c,f)}$(%) | 56 | 55 | 39 |
| Aliphatics in liquid$^{(d,f)}$(%) | 33 | 49 | 42 |
| I($^A$/O)$^{(e,f)}$ | 15.3 | 6.8 | 5.0 |
| Accumulated liquid product: | RON (clear) = 100 | | |
| | Density = 0.7905 gcm$^{-3}$ | | |

The superscripts $^{(a)}$ to $^{(f)}$ denote as per Table 2.

EXAMPLE 4

A zeolite synthesis gel was prepared from:
A. Silica (126 g, Cab-o-Sil (trade mark) suspended in water (700 g)
B. Tetra-n-propylammoniumbromide (34.8 g) in water (450 g)
C. Sodium aluminate solution (235 ml, containing 1.17 g aluminium) Potassium hydroxide solution (75 ml, 0.77 M)
D. Potassium chloride (56 g) Water (to a total of 1452 g)

Mixtures A and B were prepared separately then mixture B was added to A and stirred. Mixture C was then added, followed by the potassium chloride and additional water.

The gel was charged into a stainless steel, stirred autoclave and the gel crystallised by heating to 175–180° C. for 24 hours. The weight of solid after crystallisation washing and drying was 130.8 g.

Chemical analysis showed the product contained (w/w), 85.1% SiO$_2$, 1.54% Al$_2$O$_3$, 0.02% Na$_2$O, 0.92% K$_2$O, 8.2% C, expressing all metal as its oxide.

The product had the power X-ray diffraction pattern given in Table 4.

TABLE 4

| 2θ | I | 2θ | I | 2θ | I |
|---|---|---|---|---|---|
| 9.22 | VS | 20.67 | MW | 31.40 | MW |
| 10.27 | S | 22.43 | MW | 31.99 | W |
| 10.56 | SM | 23.21 | VW | 34.10 | M |
| 11.48 | W | 23.69 | MW | 34.95 | MW |
| 13.81 | M | 24.27 | M | 35.36 | W |
| 14.58 | W | 25.34 | VW | 40.13 | W |
| 15.36 | W | 25.83 | MW | 42.12 | W |
| 16.18 | M | 26.91 | VVS | 43.10 | VW |
| 17.03 | MW | 27.04 | VS | 43.85 | W |
| 17.21 | M | 27.85 | S | 52.88 | W |
| 18.04 | M | 28.39 | S | 53.23 | MW |
| 18.50 | M | 29.78 | W | | |
| 19.22 | W | 30.16 | M | | |
| 20.08 | W | 31.10 | MW | | |

EXAMPLE 5

A zeolite synthesis gel was prepared by:
Dissolving aluminium wire (6.0/ g) in sodium hydroxide solution (15 g NaOH in 100 g water) to form mixture A.

Mixing tetra-n-propylammonium bromide (166.6 g), water (approx. 800 g) and Ludox (trade mark) HS40 silica-sol (686.3 g) to form mixture B.

Mixtures A and B were mixed and diluted with water (approx. 700 g) and the gel stiffened by the further addition of sodium chloride (200 g).

The gel was charged to a stainless steel, stirred autoclave and crystallised by heating to 171° C. for 64 hours.

The weight of filtered dried product was 306 g.

Chemical analysis showed the product contained (w/w), 81.6% SiO$_2$, 3.37% Al$_2$O$_3$, 1.37% Na$_2$O, and 6.9% C, expressing all metal as its oxide.

The product zeolite had the powder X-ray diffraction pattern given in Table 5.

TABLE 5

| 2θ | I | 2θ | I | 2θ | I |
|---|---|---|---|---|---|
| 9.18 | VS | 20.02 | VW | 30.07 | MW |
| 10.24 | S | 20.63 | W | 30.97 | W |
| 10.52 | MS | 22.34 | MW | 31.38 | MW |
| 11.42 | VW | 23.63 | MW | 31.92 | W |
| 13.79 | MW | 24.20 | M | 34.04 | MW |
| 14.48 | VW | 25.21 | VW | 34.89 | MW |
| 15.30 | W | 25.75 | W | 35.31 | W |
| 16.13 | MW | 26.83 | VVS | 38.08 | VW |
| 17.00 | MW | 27.00 | VS | 40.05 | VW |
| 17.14 | MW | 27.51 | MS | 42.01 | W |
| 18.00 | W | 27.80 | S | 42.08 | W |
| 18.45 | M | 28.34 | MS | 52.79 | MW |
| | | | | 53.12 | MW |

EXAMPLE 6

The catalyst product from Example 4 was used to convert propylene into an olefinic gasoline in a similar manner to that described in Example 2. Details of the conversion are given in Table 6.

TABLE 6

| Feed | Propylene |
|---|---|
| WHSV | 1.0 hr$^{-1}$ |
| Set temperature$^{(a)}$ | 300° C. |
| Max temperature$^{(b)}$ | 403° C. |
| Propylene conversion | 81% |
| Liquid yield$^{(c)}$ | 61% |
| Aliphatics in liquids$^{(d)}$ | 86.6% |
| I($^A$/O)$^{(e)}$ | 0.09 |
| RON (clear) | 96.1 |

The superscripts $^{(a)}$ to $^{(e)}$ denote as per Table 2.

EXAMPLE 7

The catalyst product from Example 5 was used to convert propylene into an olefinic gasoline in a similar manner to that described in Example 2. Details of the conversion are given in Table 7.

TABLE 7

| Feed | Propylene |
|---|---|
| WHSV | 1.9 hr$^{-1}$ |
| Set temperature$^{(a)}$ | 300° C. |
| Max temperature$^{(b)}$ | 449° C. |
| Propylene conversion | 89% |
| Liquid yield$^{(c)}$ | 67% |
| Aliphatics in liquids$^{(d)}$ | 77.6% |
| I$^A$/O)$^{(e)}$ | 0.7 |
| RON (clear) | 97.8 |

The superscripts $^{(a)}$ to $^{(e)}$ denote as per Table 2.

EXAMPLE 8

A zeolite synthesis gel was prepared from:
A. 4.0 g of Aluminium dissolved in potassium hydroxide solution (17.1 g potassium hydroxide dissolved in 66.0 g of water).
B. 445.0 g of Ludox, HS40 dissolved in 330.0 g of water.
C. Tetra-n-propylammonium bromide (98.5 g) dissolved in 330.0 g of water.
D. Potassium chloride (33 g)

Solutions A and B were prepared separately and then solution A was added to solution B and stirred. Solution C was then added, followed by potassium chloride 133 g.

The gel was charged into a stainless steel autoclave and crystallised by heating to 185° C. for 16 hours. The weight of the solid catalyst obtained was 200 g.

A portion of the catalyst product was blended with acid exchanged bentonite in the ratio 2:1 and used to convert propylene into olefinic gasoline in a similar manner to that described in Example 2, except that a pressure of 750 KPa was used. Details of the conversion are given in Table 8.

TABLE 8

| Feed | Propylene |
|---|---|
| WHSV | 8.6 |
| Set Temperature[a] | 400° C. |
| Max. Temperature[b] | 450° C. |
| Propylene Conversion | 60% |
| Liquid Yield[c] | 88% |
| Aliphatics in Liquids[d] | 93.3% |
| I($^d/_O$) | 0.06 |
| RON (clear) | 95.3 |

The superscripts [a] to [c] denote as per Table 2.

The product zeolite had the powder X-ray diffraction pattern given in Table 9.

TABLE 9

| 2θ | I | 2θ | I | 2θ | I |
|---|---|---|---|---|---|
| 9.23 | S | 18.51 | M | 30.13 | SM |
| 10.33 | VS | 19.22 | VW | 31.17 | M |
| 10.57 | SM | 20.72 | MW | 31.32 | SM |
| 10.89 | W | 22.41 | MW | 32.02 | MW |
| 11.49 | W | 23.67 | MW | 34.09 | M |
| 13.81 | MW | 24.23 | M | 34.93 | M |
| 14.55 | MW | 25.81 | MW | 35.37 | W |
| 15.36 | MW | 26.90 | VVS | 40.10 | W |
| 10.14 | M | 27.07 | VVS | 42.10 | MW |
| 17.04 | MW | 27.56 | S | 53.33 | SM |
| 17.19 | M | 27.86 | VS | | |
| 18.04 | M | 28.38 | S | | |

It will be appreciated that significant commercial advantages are obtained by the process of this invention, due to low catalyst manufacture costs, and lower processing costs, as no diluent is required.

It will be clearly understood that the invention in its general aspects is not limited to the specific details referred to hereinabove.

The claims defining the invention are as follows:

1. Process for conversion of a light olefinic feed stock into gasoline by contact with a zeolite catalyst, characterized in that the catalyst has not been subjected to ion exchange, contains at least 0.5% by weight of a Group IA metal oxide, and has an X-ray powder diffraction pattern (Co radiation) exhibiting the presence of ZSM-5 zeolite and characterized by a peak in the region $2\theta = 27.0 \pm 0.2$ degrees which is greater in intensity than peaks at both $2\theta = 9.20 \pm 0.2$ and $2\theta = 10.25 \pm 0.2$ degrees.

2. Process according to claim 1 in which the feedstock comprises propylene and has no co-fed water diluent.

3. Process according to claim 1 in which the feedstock comprises propylene and has no co-fed diluent.

4. Process according to claim 1 in which the feedstock consists essentially of propylene.

5. Process according to claim 2 or claim 3 in which the feedstock comprises propylene and other light olefin.

6. Process according to claim 1 in which a feedstock comprising propylene is contacted with the said catalyst at temperature below 350° C. to produce an olefinic gasoline of RON (clear) between 90 and 98.

7. Process according to claim 6 in which the olefinic gasoline produced is of RON (clear) between 92 and 97.

8. Process for conversion of a light olefin feedstock into an olefinic gasoline characterized by contacting the feedstock at temperature below 350° C., without any co-fed water diluent, with a zeolite catlyst which has not been subjected to ion exchange, said catalyst containing at least 0.5% by weight of sodium and/or potassium expressed as oxide, said catalyst having an X-ray powder diffraction pattern (Co radiation) exhibiting the presence of ZSM-5 zeolite and characterized by a peak in the region $2\theta = 27.0 \pm 0.2$ degrees which is greater in intensity than peaks at both $2\theta = 9.20 \pm 0.2$ and $2\theta = 10.25 \pm 0.2$ degrees; and recovering an olefinic gasoline product of RON (clear) between 90 and 98.

* * * * *